United States Patent [19]

Miller

[11] Patent Number: 4,516,485

[45] Date of Patent: May 14, 1985

[54] DEVICE FOR COOKING FOOD

[75] Inventor: Dye O. Miller, South Barrington, Ill.

[73] Assignee: A. J. Antunes & Co., Addison, Ill.

[21] Appl. No.: 278,313

[22] Filed: Jun. 29, 1981

[51] Int. Cl.³ ............................................. A47J 37/04
[52] U.S. Cl. ....................................... 99/339; 99/423; 99/441
[58] Field of Search ............. 99/441, 423, 427, 443 R, 99/339, 348

[56] References Cited

U.S. PATENT DOCUMENTS

| 2,584,061 | 1/1952 | Stilphen | 99/441 |
| 2,631,525 | 3/1953 | Finizie | 99/441 |
| 2,905,076 | 9/1959 | Del Francia | 99/443 R |
| 3,298,303 | 1/1967 | Waller | 99/423 |
| 3,335,262 | 8/1967 | Smart et al. | 99/339 |

Primary Examiner—Billy J. Wilhite
Attorney, Agent, or Firm—McDermott, Will & Emery

[57] ABSTRACT

A food cooking device includes a housing with an inclined platen or top surface mounted thereon. A heating assembly for heating the platen is included in the housing along with a drawer into which food items may be placed for warming. A grid including a plurality of rods extending transversely across the inclined platen is slideably mounted on the platen and connected by a linkage assembly to a rotary motor. The linkage assembly translates the rotary motion of the motor to linear reciprocating motion that is imparted to the grid. Food items may be positioned on the platen between adjacent rods to be moved a predetermined distance over the platen by the reciprocating rods to ensure cooking on all sides of the food item.

8 Claims, 6 Drawing Figures

DEVICE FOR COOKING FOOD

BACKGROUND OF THE INVENTION

A. Field of the Invention

The present invention relates to a new and improved device for cooking food items.

B. Description of the Prior Art

Hot dogs and similar food items are often sold in stands, at baseball parks and at similar locations and in large quantities requiring substantial numbers of the hot dogs or similar food items to be cooked at the same time. Because of the tubular configuration, hot dogs are preferably cooked on all sides. If the hot dogs are placed on a flat surface, they require an individual to constantly watch the hot dogs while they are being cooked in order to rotate the hot dogs. This requirement limits the number of hot dogs that can be cooked at a single time and requires the full attention of an individual who could be performing other tasks. Thus, it is desirable to provide a device that will automatically cook hot dogs and similar food items on all sides.

SUMMARY OF THE INVENTION

An object of the present invention is to provide a new and improved device for cooking hot dogs and similar food items.

Another object of the present invention is to provide a new and improved device for cooking hot dogs and similar food items that rotates them over a heated platen to ensure cooking on all sides.

The present invention is directed to a new and improved device for heating or cooking food items such as hot dogs and the like. The device includes a housing with a heating assembly. A drawer is located in the housing for the placement of food items such as buns and the like for warming. The housing also includes an inclined platen or top surface mounted thereon for cooking food items and a grid including a plurality of rods extending transversely across the platen is slideably mounted on the platen and connected by a linkage to a rotary motor. The linkage translates the rotary motion of the motor into lineal motion that is imparted to the grid causing reciprocal motion of the grid and the rods over a predetermined distance along the platen. The rods are spaced a sufficient distance such that food items such as hot dogs and the like may be positioned between the rods to engage the platen. The reciprocal movement of the rods causes rolling of the hot dogs over the heated platen ensuring complete cooking of the hot dog or similar food item.

BRIEF DESCRIPTION OF THE DRAWINGS

The above and other object and advantages and novel features of the present invention will become apparent from the following detailed description of preferred embodiments of the invention illustrated in the accompanying drawings wherein.

DETAILED DESCRIPTION OF THE PREFERRED EMBODIMENT

Figure 1:
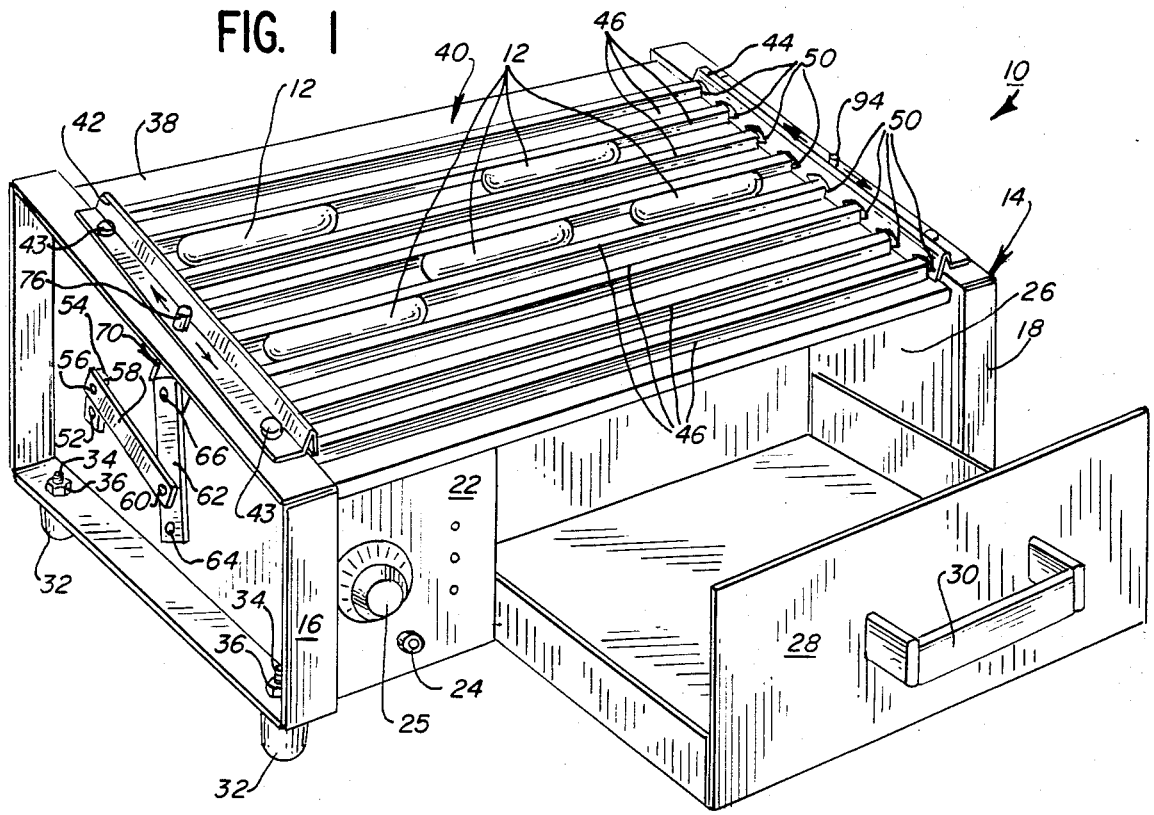
FIG. 1 is a perspective view of a device constructed in accordance with the principles of the present invention.
Figure 2:
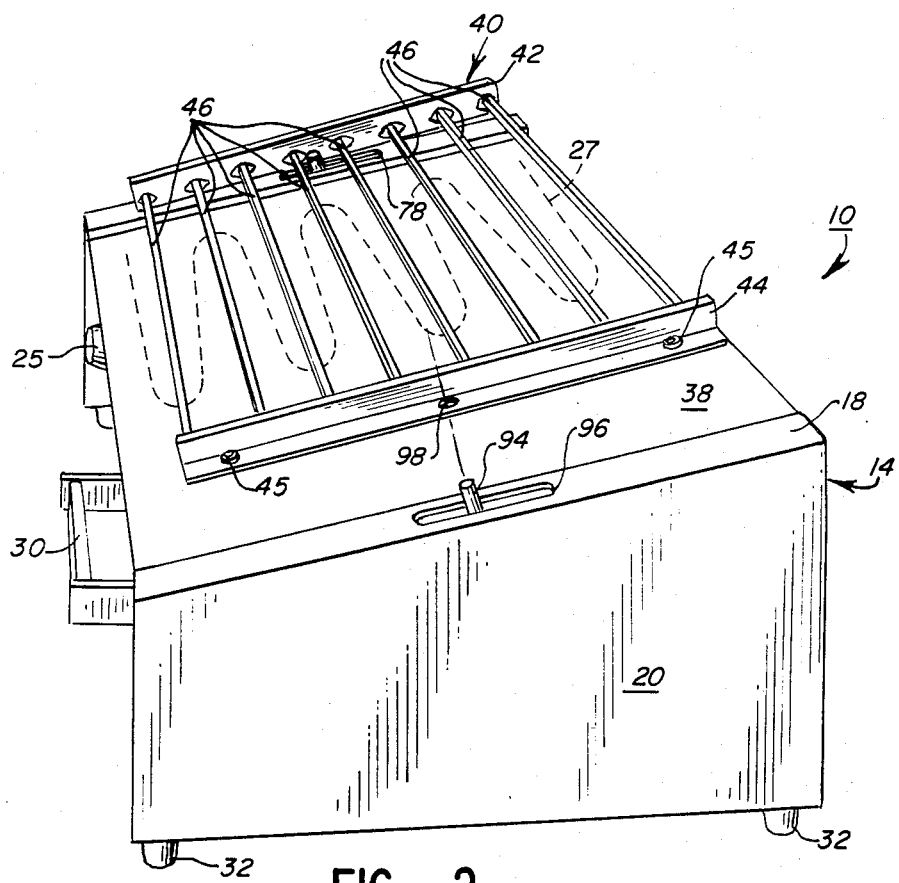
FIG. 2 is a partially exploded side view of the device of the present invention.

Referring now to the drawings, there is illustrated a device generally designated by the reference numeral 10 that is adapted to cook food items such as hot dogs 12 or the like on all sides. The device 10 is capable of automatically cooking hot dogs 12 or similar food items while an attendant may be performing other tasks. In addition, the cooking device 10 cooks the food items on all sides ensuring thorough and complete cooking thus preventing uneven cooking that could result in burning or similar destruction of the food items.

The cooking device 10 includes a housing generally designated by the reference numeral 14. The housing 14 includes side frame members 16 and 18 that surround and define an interior space within which a linkage assembly to be explained hereinafter is positioned. Covers or side panels 20 cover the space defined by the side frames 16 and 18 and provide a desirable exterior appearance. The housing 14 further includes a front panel 22 on which is mounted ON-OFF switch 24 and a thermostat knob 25 that controls the temperature of a heating assembly 27 mounted within the housing 14.

A space or opening 26 is defined within the housing between the side frame 18 and the front panel 22. A drawer 28 with a handle 30 is slideably mounted within the opening 26 and may serve to contain food items such as buns and the like that when positioned within the housing 14, are maintained warm by the heating element. The housing 14 as described is mounted on legs 32 that are secured to the side frames 16 and 18 by screws 34 and nuts 36. The legs 32 may be of a plastic or elastomeric material to allow the cooking device 14 to be placed on a surface without marring the surface by scratching or from exposure to high temperatures that may be transmitted from the heating element to the side frames 16 and 18. The cooking device 10 and the housing 14 further include an upper inclined surface or platen 38 that is heated by the heating elements mounted within the housing 14. Once food items such as hot dogs 12 or the like are placed on the heated platen 38, they are cooked by this platen 38 due to the temperature transmitted from the heating element.

The food items such as the hot dogs 12 or the like that are placed on the heated platen 38 will only be cooked on one side unless an attendant is constantly watching the hot dogs 12. Accordingly, it is desirable to provide structure for allowing automatic cooking of the hot dogs 12 or similar food items and to ensure cooking on all sides. This is accomplished in the present invention through the employment of a grid generally designated by the reference numeral 40. The grid 40 includes two side frames 42 and 44 that are positioned on the side frame members 16 and 18, respectively on sliding elements 43 and 45. The side frames 42 and 44 are merely placed on the side frames 16 and 18 to allow sliding action thereover. Extending between the side frames 42 and 44 are a plurality of rods 46 that are spaced a sufficient distance from each other to allow placement of a food item such as a hot dog 12 therebetween such that the bottom surface of the hot dog 12 engages the heated platen 38. The rods 46 extend into apertures 50 fabricated in the side members 42 and 44.

In order to fully cook the food items such as the hot dogs 12 on all sides the grid 40 is reciprocated relative to the heated platen 38 thereby rolling the hot dogs 12 over a predetermined distance on the heated platen 38. This distance is such that all sides of the hot dogs 12 come in contact with the heated platen 38 to ensure full cooking of the hot dogs 12. The grid 40 is reciprocated by a rotary motor (not shown) mounted within the housing 14. A shaft 52 of the rotary motor extends into the space defined by the side frames 16 and 18. A motor crank 54 is rigidly mounted to the rotary shaft 52 so as to e rotated thereby. A free end of the motor crank 54 is rotatably or pivotally connected by a pin 56 to an end of an elongated crank arm 58. At the opposite or free end of the elongated crank 58 a pin 60 connects that end to a drive arm 62 between the ends thereof so that the two pivot relative to each other. The drive arm 62 at a first end pivotally secured by a pin 64 to the side frame 16 and at a second end is pivotally connected by a pin 66 to a slide bracket 68 that is part of a slide assembly generally designated by the reference numeral 70. The slide assembly 70 further includes a slide 72 in which the slide bracket 68 is slidably mounted. The slide 72 is secured to a slide retainer 74 in a manner to allow the slide 72 and slide bracket 68 to slide relative to the slide retainer 74. A drive pin 76 is rigidly secured to the slide 72 and extends through a slot 78 defined in the side member 16 and into an aperture 80 defined in the side frame 42.

Figure 4:
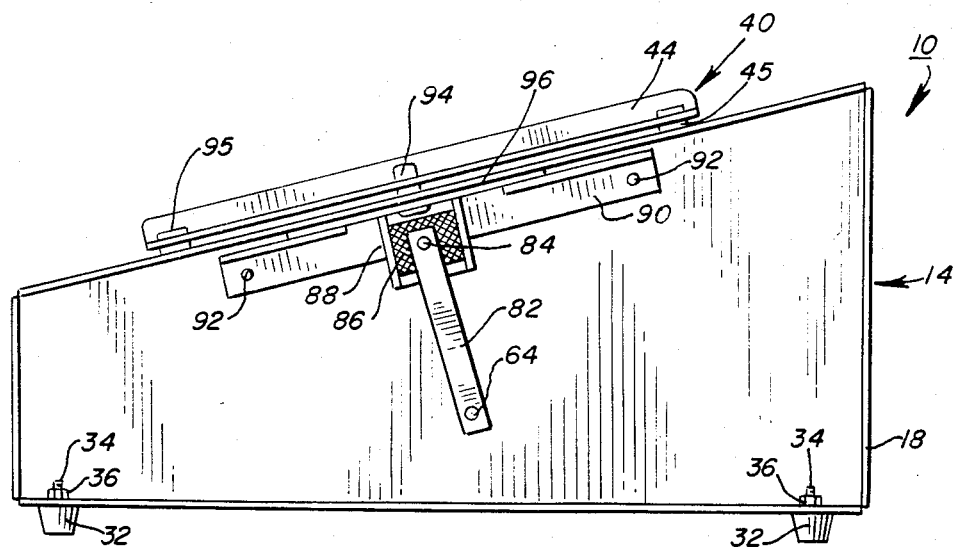
FIG. 4 is a driven side view illustrating the linkage assembly.

Referring to FIG. 4, the driven side of the device 10 is illustrated. As illustrated, a crank 82 is rigidly connected at one end to the shaft 64 to be rotated thereby. The other end of the crank 82 is pivotally connected by a pin 84 to a slide bracket 86 that is slidably mounted in a slide 88. The slide 88 is slidably mounted in a slide retainer 90 that is secured to the side frame 18 by fasteners 92. A drive pin 94 is rigidly secured to the slide retainer 90 and extends through a slot 96 in the top of side frame 18 and through an aperture 98 in the side frame 44.

Figure 3:
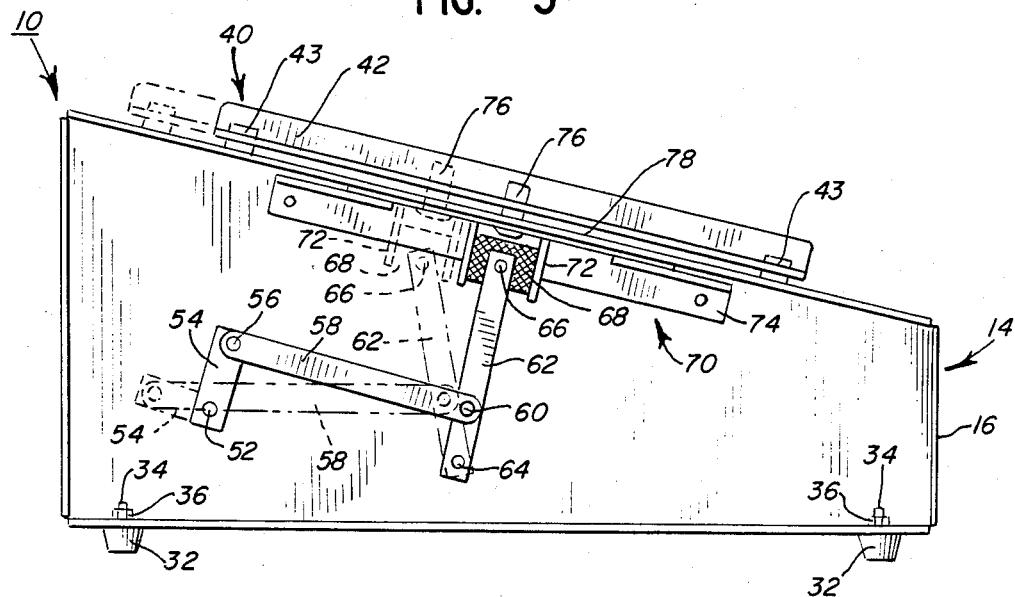
FIG. 3 is a motor side view of the linkage assembly employed in the device of the present invention.

As best seen in FIGS. 3 and 4, the rotary motion of the motor is transmitted from the motor shaft 52 through the motor side linkage assembly defined by the members 54, 58 62 and the slide assembly 70 and the driven side linkage assembly defined by the members 82, 86, 88 and 90 to reciprocating or linear motion of the pins 76 and 94. This reciprocating motion of the pins 76 and 94 within the slots 78 and 96 causes reciprocating sliding motion of the grid 40 along a predetermined distance on the heated platen 38.

Figure 5:
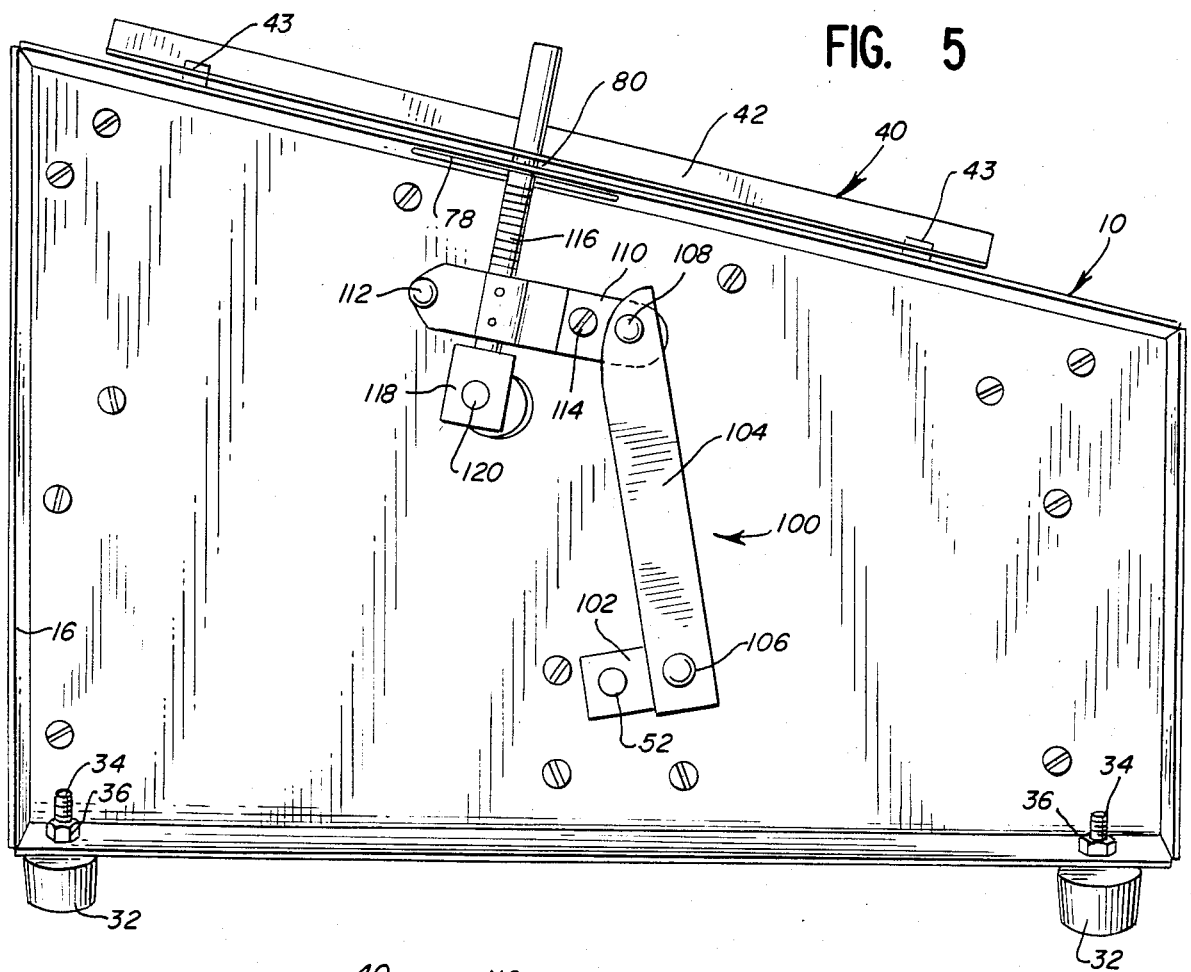
FIG. 5 is a view similar to FIG. 3 with an alternative linkage assembly.
Figure 6:
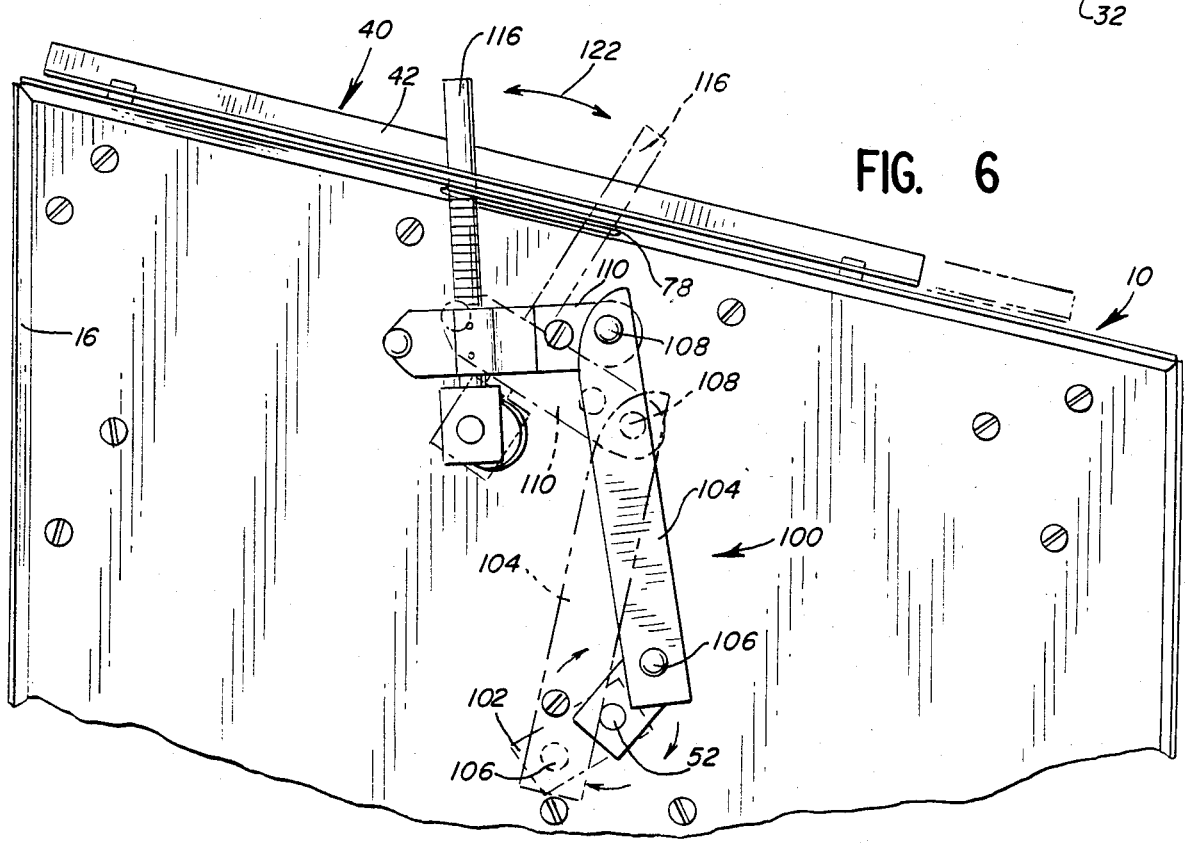
FIG. 6 is a view similar to FIG. 5 illustrating the action of the alternative linkage assembly.

Referring now to FIGS. 5 and 6 there is illustrated an alternative linkage assembly generally designated by the reference numeral 100. The linkage assembly 100 is illustrated as being mounted on the device 10 previously described. Those components of the device 10 that are the same in FIGS. 5 and 6 as appears in FIGS. 1–4 are identified by the same reference numeral.

The linkage assembly 100 includes a first bar or member 102 that is rigidly secured at a first end to the motor shaft 52 and rotated thereby. The bar 102 is pivotally secured at a second end to an elongated bar 104 by a pin 106. The end of the bar 104 opposite pin 106 is pivotally connected by a pin 108 to a third bar 110. The third bar 100 is defined by two plates secured together by pins 112 and 114 and the plates are convex or outwardly bowed so as to surround and secure a rod 116 thereto. The rod 116 includes a first end rigidly mounted in a mounting block 118 that is pivotally mounted to the side frame 16 by a pin 120. The other end of the rod 116 extends through the slot 78 defined in the top of the side frame 16 and further extends into the aperture 80 defined in the side frame 42 of the grid 40.

As best illustrated in FIG. 6, as the motor shaft 52 is rotated, the rotary movement is transmitted through the linkage assembly 100 to impart pivoting of the rod 116 about an axis defined by the pin 120. In the manner illustrated by solid and dotted lines in FIG. 6 this movement of the rod 116 in the direction of the arrow 122 imparts reciprocating movement of the grid 40 on the heated platen 38 in the manner previously described.

What is sought to be claimed and secured by Letters Patent of the United States is:

1. An apparatus for heating food items, comprising:
   a housing,
   an inclined platen mounted on said housing,
   means for heating said platen,
   a grid slideably positioned on said platen, said grid including a plurality of food item supports extending across said inclined platen, and
   means for reciprocally sliding said grid up and down on said inclined platen.

2. The apparatus set forth in claim 1 wherein said supports are spaced from each other a distance to allow the placement of said food items onto said platen and between adjacent rods.

3. The apparatus set forth in claim 1 further comprising a storage drawer mounted in said housing for containing and warming said food items.

4. The apparatus set forth in claim 1 wherein said sliding means includes a rotary motor and a linkage means connected to said motor and said grid for translating rotary motion from said motor into linear motion to said grid.

5. An apparatus for cooking food, comprising:
   a housing, said housing including an inclined top surface, means for heating said top surface, a food moving assembly slideably mounted on said top surface for moving said food over said top surface for fully cooking said food, said food moving assembly including a grid with a plurality of rods extending transversely of said top surface, said rods being spaced a predetermined distance to allow placement of said food between adjacent rods allowing said rods to move said food a prdetermined distance over said top surface for complete cooking thereof, and means for reciprocally moving said grid up and down over said top surface.

6. The apparatus claimed in claim 5 further comprising a drawer for warming said food mounted in said housing.

7. The apparatus claimed in claim 5 wherein said food moving assembly further comprises a rotary motor mounted in said housing and a linkage assembly coupling said grid to said motor.

8. The apparatus claimed in claim 7 wherein said linkage assembly comprises a motor crank with a first end secured to said motor, a crank arm with a first end pivotally mounted to a second end of said motor crank, a drive arm with a first end pivotally mounted to a second end of said crank arm and a second end pivotally mounted to a slide assembly, said slide assembly slidably mounted on said housing and removably secured to said grid.

* * * * *